US012562914B2

(12) United States Patent
Yamada et al.

(10) Patent No.: US 12,562,914 B2
(45) Date of Patent: Feb. 24, 2026

(54) INFORMATION MANAGEMENT SYSTEM

(71) Applicant: HITACHI ASTEMO, LTD.,
Hitachinaka (JP)

(72) Inventors: Tetsuya Yamada, Tokyo (JP); Masashi Seimiya, Tokyo (JP); Yasuhiro Fujii, Tokyo (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 238 days.

(21) Appl. No.: 18/258,412

(22) PCT Filed: Sep. 8, 2021

(86) PCT No.: PCT/JP2021/033001
§ 371 (c)(1),
(2) Date: Jun. 20, 2023

(87) PCT Pub. No.: WO2022/176240
PCT Pub. Date: Aug. 25, 2022

(65) Prior Publication Data
US 2024/0048388 A1 Feb. 8, 2024

(30) Foreign Application Priority Data
Feb. 16, 2021 (JP) ................................. 2021-022213

(51) Int. Cl.
*H04L 9/32* (2006.01)
*G06F 21/62* (2013.01)
(Continued)

(52) U.S. Cl.
CPC ........ *H04L 9/3231* (2013.01); *G06F 21/6245* (2013.01); *H04L 9/0894* (2013.01);
(Continued)

(58) Field of Classification Search
CPC ....... H04L 9/3231; H04L 9/0894; H04L 9/30; H04L 9/3247; G06F 21/6245; G06Q 40/08
See application file for complete search history.

(56) References Cited

U.S. PATENT DOCUMENTS

2013/0218427 A1*  8/2013  Mukhopadhyay ...... G06F 17/00
701/99
2014/0328248 A1*  11/2014  Greubel ................ H04W 8/005
370/328
(Continued)

FOREIGN PATENT DOCUMENTS

JP        2005-303615  A    10/2005
JP        2009-169486  A    7/2009
(Continued)

OTHER PUBLICATIONS

International Search Report with English Translation and Written Opinion of International Patent Application No. PCT/JP2021/033001 dated Nov. 30, 2021 (9 pages).

*Primary Examiner* — Hee K Song
(74) *Attorney, Agent, or Firm* — Foley & Lardner LLP

(57) ABSTRACT

The present disclosure provides an information management system capable of solving a problem related to handling of information regarding each driver when a plurality of drivers drives one vehicle. An information management system 1 according to an aspect of the present disclosure manages driver information DI regarding a driver of a vehicle V. The information management system 1 includes a driver identification unit 111 that acquires personal identification information PI of the driver, an information acquisition unit 12 that acquires driver information DI including travel information of the vehicle V, and individual information storage units 125 and 132 that store individual information PD in
(Continued)

which the personal identification information PI and the driver information DI are associated with each other.

8 Claims, 11 Drawing Sheets

(51) Int. Cl.
  *H04L 9/08*          (2006.01)
  *H04L 9/30*          (2006.01)
  *G06Q 40/08*          (2012.01)
(52) U.S. Cl.
  CPC .............. *H04L 9/30* (2013.01); *H04L 9/3247*
            (2013.01); *G06Q 40/08* (2013.01)

(56)                     References Cited

U.S. PATENT DOCUMENTS

| | | | |
|---|---|---|---|
| 2017/0200336 A1* | 7/2017 | Schmidt .................. | G08C 17/02 |
| 2017/0255966 A1* | 9/2017 | Khoury ................. | B60W 40/00 |
| 2018/0013873 A1* | 1/2018 | Farrell .................. | H04W 76/10 |
| 2020/0226529 A1* | 7/2020 | Davidson ......... | G06Q 10/06398 |

FOREIGN PATENT DOCUMENTS

| | | |
|---|---|---|
| JP | 2014-235609 A | 12/2014 |
| JP | 2018-055191 A | 4/2018 |
| JP | 2020-017805 A | 1/2020 |
| SG | 10201401306V A | 1/2015 |

* cited by examiner

FIG. 8

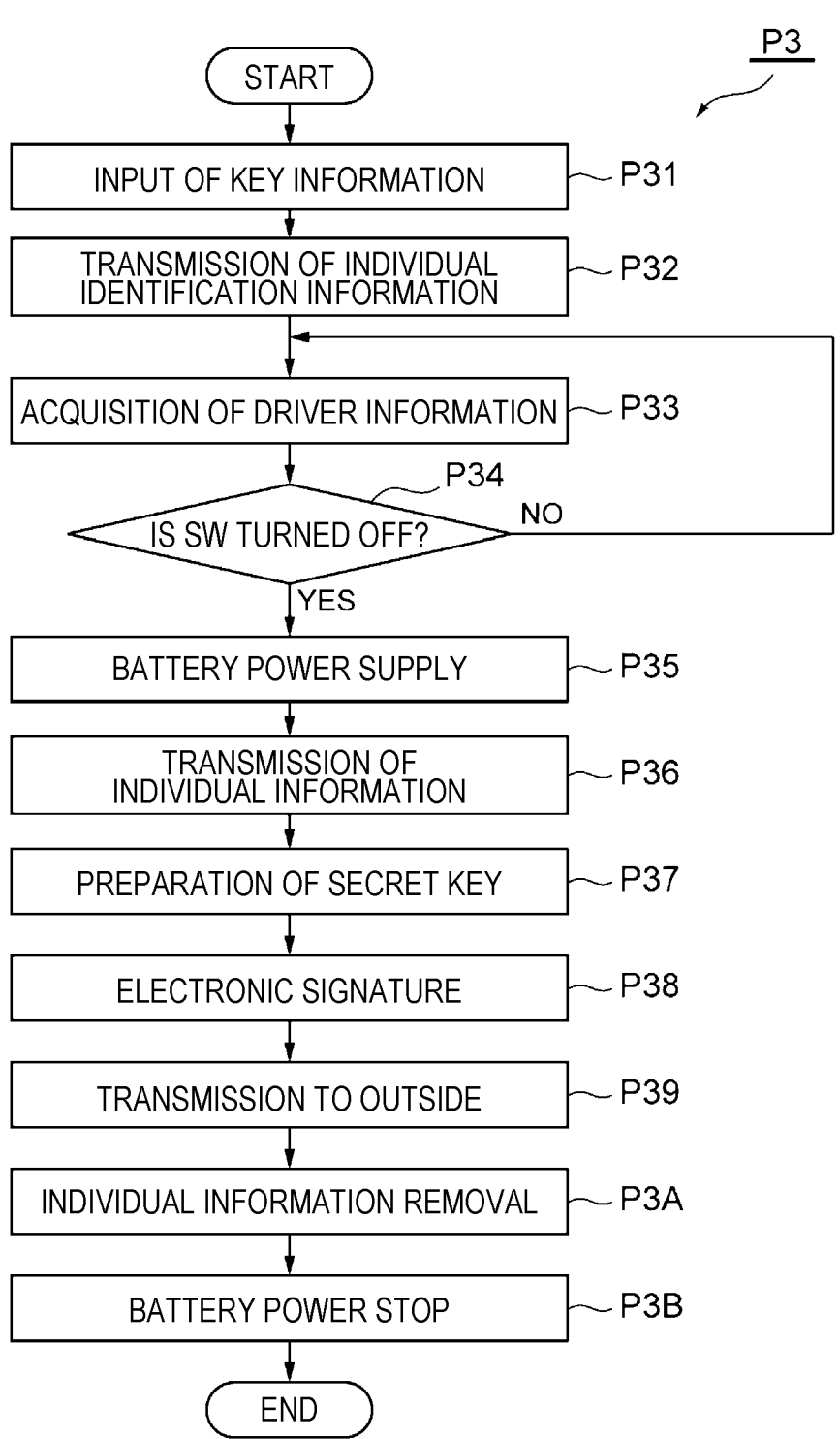

P3

START

INPUT OF KEY INFORMATION — P31

TRANSMISSION OF INDIVIDUAL IDENTIFICATION INFORMATION — P32

ACQUISITION OF DRIVER INFORMATION — P33

P34

IS SW TURNED OFF?    NO

YES

BATTERY POWER SUPPLY — P35

TRANSMISSION OF INDIVIDUAL INFORMATION — P36

PREPARATION OF SECRET KEY — P37

ELECTRONIC SIGNATURE — P38

TRANSMISSION TO OUTSIDE — P39

INDIVIDUAL INFORMATION REMOVAL — P3A

BATTERY POWER STOP — P3B

END

INFORMATION MANAGEMENT SYSTEM

TECHNICAL FIELD

The present disclosure relates to an information management system that manages information regarding a driver of a vehicle.

BACKGROUND ART

In the related art, there is known a data collection system that includes an on-vehicle device mounted on a vehicle and a server that communicates with the on-vehicle device via a network and collects probe data from the vehicle (PTL 1, Abstract, Claim 1, and the like). In this data collection system of the related art, the server includes a data collection condition determination unit, a data collection condition distribution unit, and a probe reception processing unit. Furthermore, the on-vehicle device includes a data acquisition unit, a collected data narrowing processing unit, and a probe data transmission unit.

The data collection condition determination unit of the server determines a data collection condition including a collection frequency of probe data in the vehicle. Furthermore, the data collection condition distribution unit of the server distributes the data collection condition determined by the data collection condition determination unit to the vehicle. Furthermore, the probe reception processing unit of the server receives the probe data transmitted from the vehicle and accumulates the received probe data in a storage device.

The data acquisition unit of the on-vehicle device acquires data regarding a surrounding environment or a state of the vehicle. Furthermore, the collected data narrowing processing unit of the on-vehicle device extracts the probe data from the data acquired by the data acquisition unit for each collection frequency based on the data collection condition distributed from the server. Furthermore, the probe data transmission unit of the on-vehicle device transmits the probe data extracted for each collection frequency by the collected data narrowing processing unit to the server.

CITATION LIST

Patent Literature

PTL 1: JP 2018-055191 A

SUMMARY OF INVENTION

Technical Problem

According to the data collection system of the related art, the data acquired by the vehicle can be collected at an appropriate data collection frequency in the server (PTL 1, paragraph 0008, and the like). However, this data collection system of the related art has a problem related to handling of information related to each driver in a case where a plurality of drivers drives one vehicle, such as car sharing.

The present disclosure provides an information management system capable of solving a problem related to handling of information regarding each driver when a plurality of drivers drives one vehicle.

Solution to Problem

One aspect of the present disclosure is an information management system that manages driver information regarding a driver of a vehicle. The information management system includes a driver identification unit that acquires personal identification information of the driver, an information acquisition unit that acquires the driver information including travel information of the vehicle, and individual information storage unit that stores individual information in which the personal identification information and the driver information are associated.

Advantageous Effects of Invention

According to the above aspect of the present disclosure, it is possible to provide the information management system capable of solving the problem related to the handling of the information related to each driver when the plurality of drivers drives one vehicle.

BRIEF DESCRIPTION OF DRAWINGS

FIG. 8 is a flowchart illustrating an example of processing by the information management system of FIG. 6.

DESCRIPTION OF EMBODIMENTS

Hereinafter, embodiments of an information management system according to the present disclosure will be described with reference to the drawings.

First Embodiment

Figure 1:
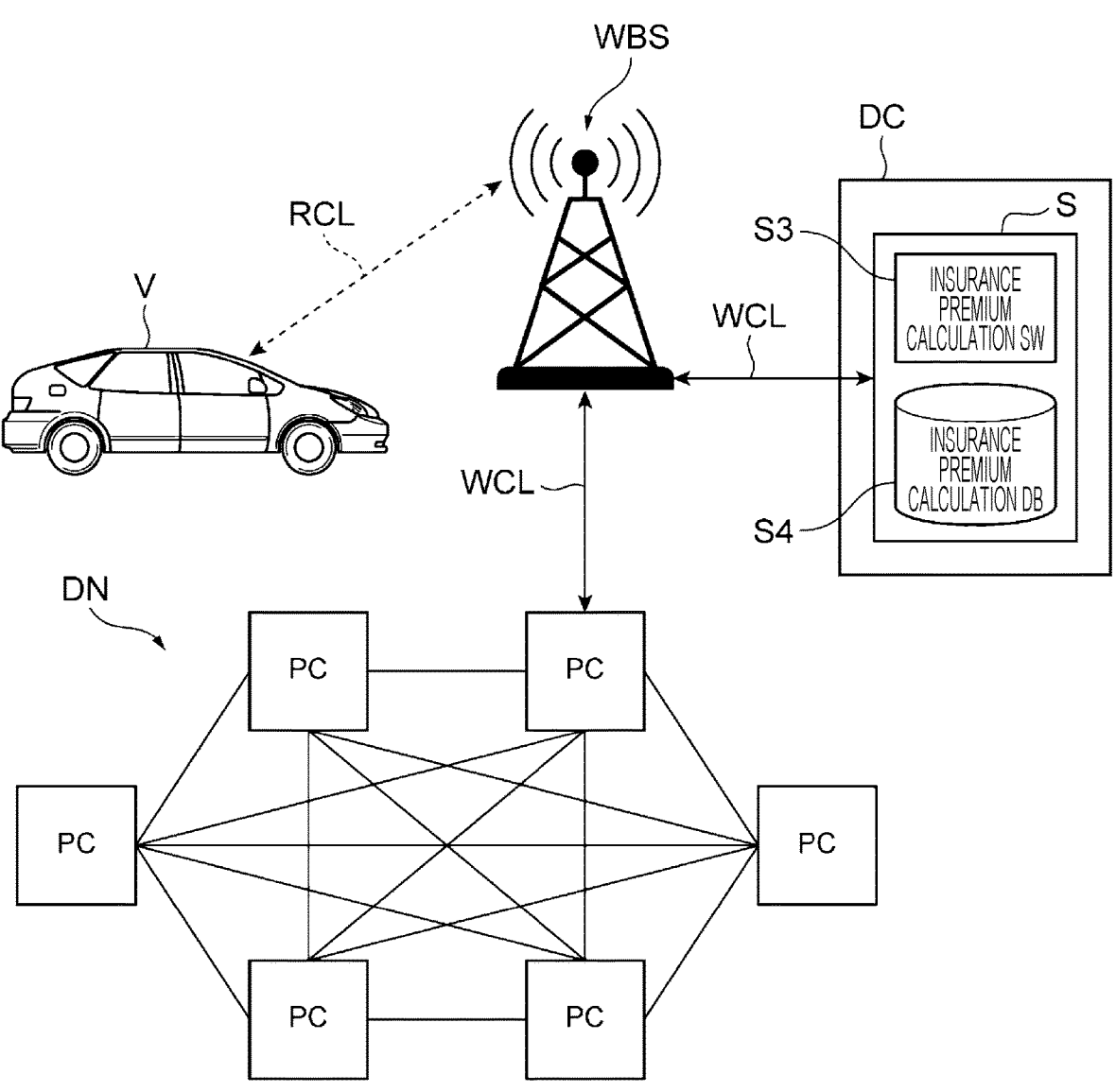
FIG. 1 is a block diagram illustrating a first embodiment of an information management system according to the present disclosure.
Figure 2:
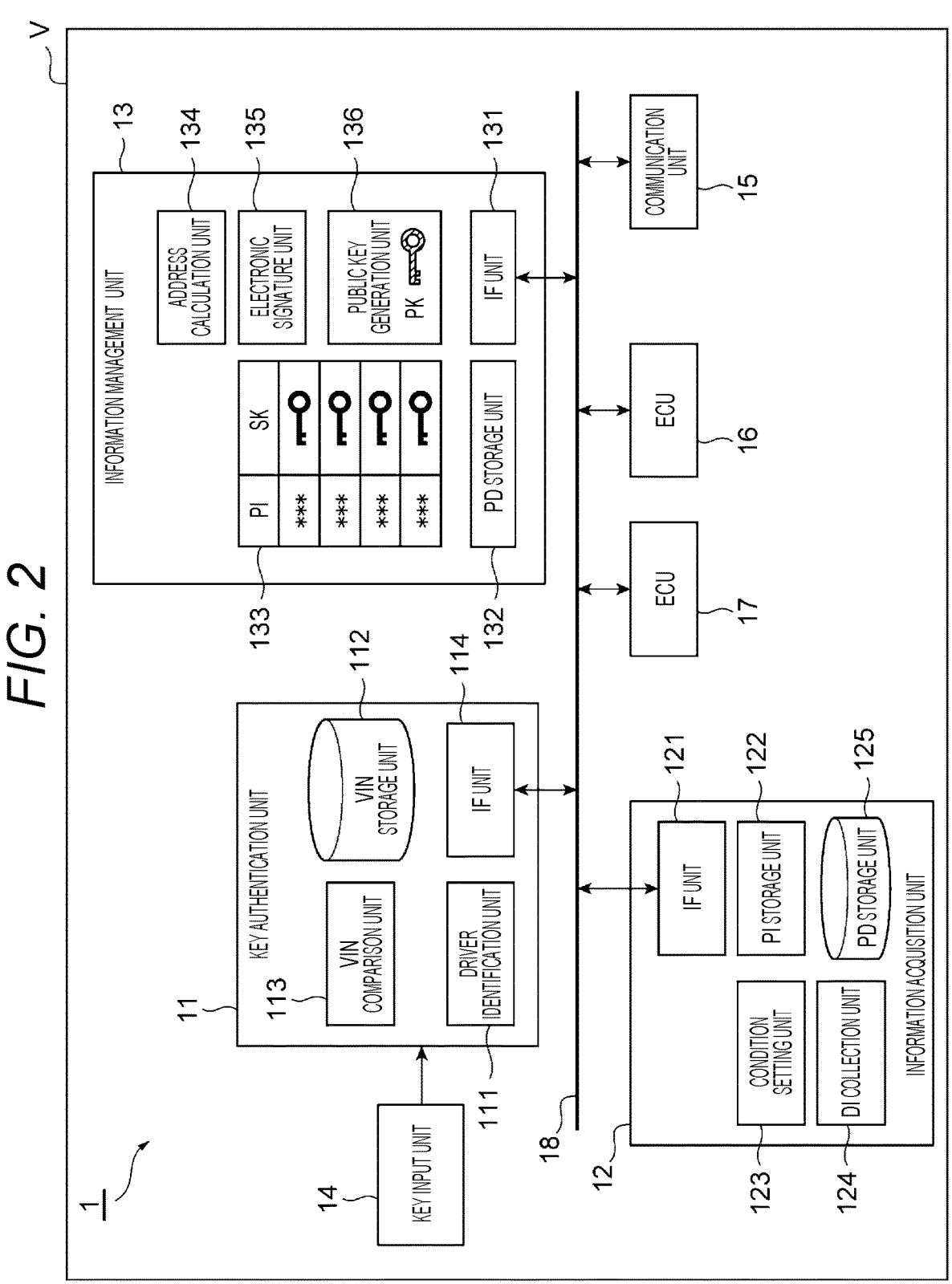
FIG. 2 is a block diagram of a vehicle on which the information management system according to the first embodiment is mounted.

FIG. 1 is a block diagram illustrating a first embodiment of an information management system according to the present disclosure. FIG. 2 is a block diagram of a vehicle V on which an information management system 1 according to the first embodiment is mounted. The information management system 1 of the present embodiment is a system that manages driver information regarding a driver of the vehicle V, and is, for example, a vehicle system mounted on the vehicle V. The vehicle V is, for example, a gasoline engine vehicle, a diesel engine vehicle, a hybrid vehicle, an electric vehicle, or a hydrogen vehicle.

As illustrated in FIG. 1, the vehicle V is connected to a server S of a data center DC and a plurality of computers PC constituting a distributed network DN via, for example, a wireless communication line RCL, a wireless base station WBS, and a wired communication line WCL. The plurality of computers PC constituting the distributed network DN perform data communication of a peer-to-peer (P2P) network scheme.

As illustrated in FIG. 2, the information management system 1 includes, for example, a key authentication unit 11 including a driver identification unit 111, an information acquisition unit 12, and an information management unit 13. Furthermore, the information management system 1 may include, for example, a key input unit 14, a communication unit 15, a plurality of electronic control units (ECU) 16 and 17, and an on-vehicle network 18, which are mounted on the vehicle V. Furthermore, the information management system 1 may include, for example, a device or a network outside the vehicle V, such as the server S of the data center DC illustrated in FIG. 1 or the computer PC constituting the distributed network DN.

The communication unit 15 includes, for example, a wireless communication device capable of communicating with a wireless base station WBS outside the vehicle V and a communication device via a wireless communication line RCL. The ECUs 16 and 17 are, for example, electronic control units for controlling a power train of the vehicle V, and various actuators constituting an advanced driving assistance system (ADAS) or an automated driving system (ADS). The on-vehicle network 18 includes, for example, a controller area network (CAN), Ethernet (registered trademark), or the like. Other general configurations of the vehicle V will not be illustrated and described.

The key input unit 14 performs wireless communication with, for example, an electronic key constituting a keyless entry system of the vehicle V or a smart key or a mobile information terminal constituting the smart entry system of the vehicle V. Accordingly, the key input unit 14 acquires encrypted information including a vehicle identification number VIN from the electronic key, the smart key, or the mobile information terminal. Furthermore, the encrypted information acquired by the key input unit 14 includes, for example, personal identification information PI. The personal identification information PI includes, for example, a personal identification number PIN. The key input unit 14 outputs the encrypted information acquired from the electronic key, the smart key, or the mobile information terminal to, for example, the key authentication unit 11.

Figure 3:
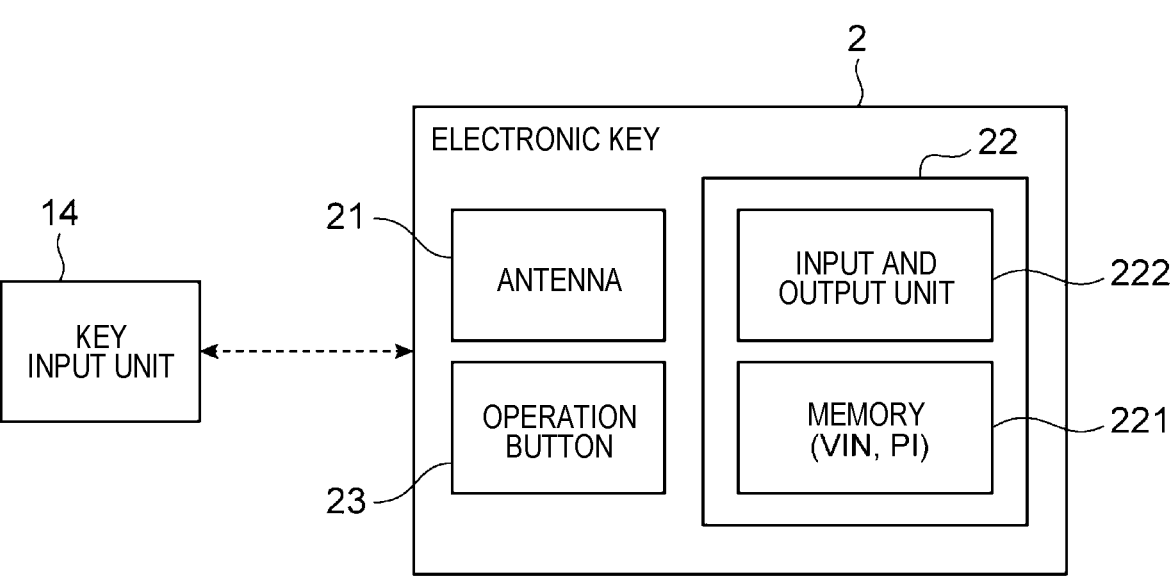
FIG. 3 is a block diagram illustrating an example of an electronic key that performs wireless communication with a key input unit of FIG. 2.

FIG. 3 is a block diagram illustrating an example of an electronic key 2 that performs wireless communication with the key input unit 14 of FIG. 2. The information management system 1 may include, for example, the electronic key 2. The electronic key 2 includes, for example, an antenna 21, a microcontroller 22, and an operation button 23. The antenna 21 performs, for example, wireless communication with the key input unit 14.

The microcontroller 22 includes, for example, a nonvolatile memory 221 and an input and output unit 222. The memory 221 stores, for example, the encrypted vehicle identification number VIN and the encrypted personal identification information PI. For example, when the operation button 23 is pressed, the input and output unit 222 reads the encrypted vehicle identification number VIN and personal identification information PI from the memory 221 and transmits the read encrypted vehicle identification number and personal identification information to the key input unit 14 via the antenna 21.

Furthermore, when a request signal is received from the key input unit 14 via the antenna 21, the input and output unit 222 reads the encrypted vehicle identification number VIN and personal identification information PI from the memory 221. Further, the input and output unit 222 transmits the encrypted vehicle identification number VIN and personal identification information PI together with a response code to the key input unit 14 via the antenna 21.

Figure 4:
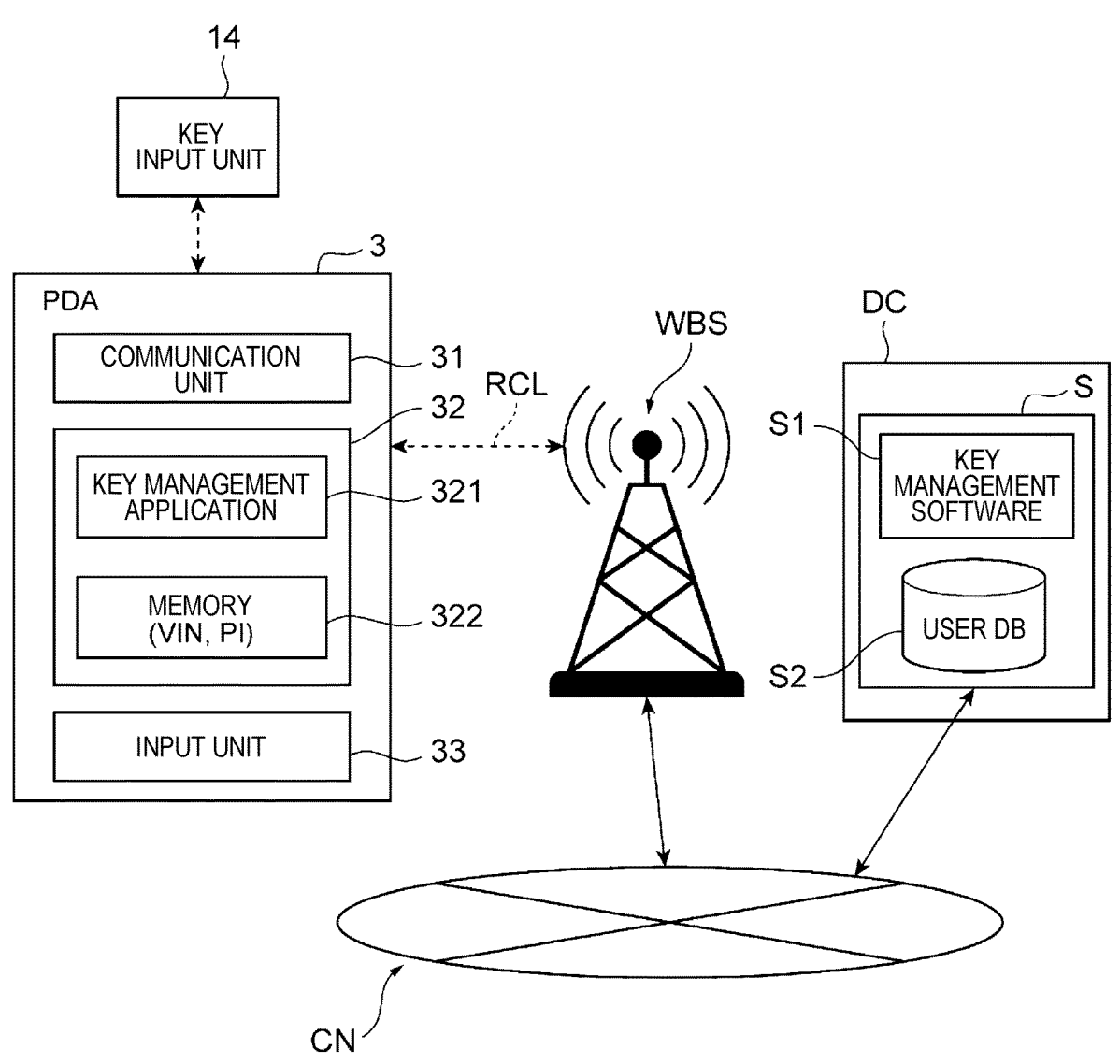
FIG. 4 is a block diagram illustrating an example of a PDA that performs wireless communication with the key input unit of FIG. 2.

FIG. 4 is a block diagram illustrating an example of the mobile information terminal 3 that performs wireless communication with the key input unit 14 of FIG. 2. Hereinafter, the mobile information terminal 3 is abbreviated as a "PDA 3". The information management system 1 may include, for example, the PDA 3. The PDA 3 is, for example, a smartphone or a tablet computer. The PDA 3 includes, for example, a communication unit 31, a microcontroller 32, and an input unit 33.

The communication unit 31 of the PDA 3 performs wireless communication with the key input unit 14 mounted on the vehicle V by short-range wireless communication such as Bluetooth (registered trademark). Note that a protocol of the short-range wireless communication is not limited to Bluetooth (registered trademark). Furthermore, the communication unit 31 communicates with the server S installed in the data center DC outside the vehicle V via, for example, the wireless communication line RCL, the wireless base station WBS, and a communication network CN.

As illustrated in FIG. 4, the server S of the data center DC includes, for example, key management software S1 and a user database S2. In the user database S2, for example, the personal identification information PI and the vehicle identification number VIN are registered in association with a user ID of the driver of the vehicle V.

The microcontroller 32 of the PDA 3 includes, for example, a key management application 321 and a memory 322. The key management application 321 is, for example, a program stored in the memory of the microcontroller 32, and is executed by a central processing unit (CPU) of the microcontroller 32. The key management application 321 transmits, for example, the user ID input by the driver of the vehicle V via the input unit 33 to the server S of the data center DC via the communication unit 31.

The key management software S1 of the server S of the data center DC is stored in a storage device of the server S and is executed by the CPU of the server S. The key management software S1 receives the user ID of the driver of the vehicle V transmitted from the PDA 3 via the wireless base station WBS and the communication network CN. By doing this, the key management software S1 reads the vehicle identification number VIN and the personal identification information PI corresponding to the received user ID from the user database S2 and encrypts the vehicle identification number and the personal identification information. Further, the key management software S1 transmits the encrypted vehicle identification number VIN and personal identification information PI to the PDA 3 via the communication network CN and the wireless base station WBS.

The key management application 321 of the PDA 3 receives the encrypted vehicle identification number VIN and personal identification information PI via the communication unit 31 and stores the received encrypted vehicle identification number and personal identification information in the memory 322. Further, the key management application 321 transmits the encrypted vehicle identification number VIN and personal identification information PI to the key input unit 14 via the communication unit 31 of the PDA 3.

Note that the key management application 321 of the PDA 3 may be installed in the server S of the data center DC. In this case, the microcontroller 32 of the PDA 3 receives an execution file for transmitting the encrypted vehicle identification number VIN and personal identification information PI from the server S of the data center DC, for example, and stores the received execution file in the memory 322. Accordingly, the key management application 321 of the PDA 3 can be omitted.

The description returns to the description of each unit of the information management system 1 illustrated in FIG. 2. The key authentication unit 11 is, for example, a microcontroller or an ECU including a CPU, a memory, a timer, and an input and output unit. The key authentication unit 11 performs authentication and identification of the vehicle V and the driver by using, as an input, the information output from the key input unit 14. The key authentication unit 11 includes, for example, a driver identification unit 111, a VIN storage unit 112, a VIN comparison unit 113, and an interface unit 114. Each unit of the key authentication unit 11 may represent, for example, a function of the key authentication unit 11 realized by executing a program stored in the memory by the CPU.

For example, the driver identification unit 111 decrypts and unencrypts the encrypted information that is the output of the key input unit 14. The driver identification unit 111 further extracts the personal identification information PI including the personal identification number PIN from the unencrypted information and separates the vehicle identification number VIN. The driver identification unit 111 outputs the vehicle identification number VIN separated from the unencrypted information to the VIN comparison unit 113. Furthermore, the driver identification unit 111 outputs the personal identification information PI including the personal identification number PIN extracted from the unencrypted information to the information acquisition unit 12 and the information management unit 13 via the interface unit 114 and the on-vehicle network 18.

The VIN storage unit 112 includes, for example, a memory, and stores a vehicle identification number VIN unique to the vehicle V. For example, the VIN comparison unit 113 compares the vehicle identification number VIN input from the driver identification unit 111 with the vehicle identification number VIN stored in the VIN storage unit 112. In a case where the vehicle identification numbers VIN coincide, the VIN comparison unit 113 transmits a comparison result to a vehicle driving ECU (not illustrated) via the interface unit 114 and the on-vehicle network 18. Accordingly, it is possible to cause the vehicle V to travel by driving a power source such as an engine or a motor of the vehicle V.

As described above, for example, the key authentication unit 11 decrypts and unencrypts the information including the encrypted vehicle identification number VIN and the personal identification information PI which are the output of the key input unit 14 by the driver identification unit 111. Accordingly, the key authentication unit 11 acquires the vehicle identification number VIN of the vehicle V and the personal identification information PI of the driver of the vehicle V, and authenticates and identifies the vehicle V and the driver of the vehicle V.

The information acquisition unit 12 is, for example, a microcontroller or an ECU including a CPU, a memory, a timer, and an input and output unit. The information acquisition unit 12 acquires driver information DI including travel information TI of the vehicle V. The information acquisition unit 12 includes, for example, an interface unit 121, a PI storage unit 122, a condition setting unit 123, a DI collection unit 124, and an individual information storage unit 125. Hereinafter, the individual information storage unit 125 may be abbreviated as a "PD storage unit 125". Each unit of the information acquisition unit 12 may represent, for example, a function of the information acquisition unit 12 realized by executing a program stored in the memory by the CPU.

The interface unit 121 transmits and receives data to and from the key authentication unit 11, the information management unit 13, and the communication unit 15 via the on-vehicle network 18, for example. The PI storage unit 122 temporarily stores the personal identification information PI input from the key authentication unit 11 via the interface unit 114, the on-vehicle network 18, and the interface unit 121. The condition setting unit 123 sets conditions such as a type, a frequency, and a format of the driver information DI collected by the DI collection unit 124.

The DI collection unit 124 collects the driver information DI via the interface unit 121 and the on-vehicle network 18 according to the condition set by the condition setting unit 123. Here, the driver information DI includes at least the travel information TI of the vehicle V. More specifically, the DI collection unit 124 collects, for example, detection results output from an on-vehicle camera, an on-vehicle sensor, and a receiver of a global positioning satellite system (not illustrated) via the interface unit 121. Further, the DI collection unit 124 calculates the travel information TI by using the collected detection result of the on-vehicle camera or the like, for example.

For example, as shown in Table 1 below, the PD storage unit 125 stores the individual information PD in which the driver information DI collected by the DI collection unit 124 is associated with the personal identification information PI of the driver of the vehicle V stored in the PI storage unit 122. The travel information TI of the vehicle V includes, for example, a driving tendency DT of the driver of the vehicle V. The driving tendency DT of the driver includes, for example, the number of times for each record date of an item as shown in Table 1. Note that the items of the driving tendency DT of the driver shown in Table 1 are an example, and are not particularly limited.

TABLE 1

| INDIVIDUAL INFORMATION PD | |
|---|---|
| PERSONAL IDENTIFICATION INFORMATION PI | DRIVER INFORMATION DI |
| *** | TRAVEL INFORMATION TI ... |
| | DRIVING TENDENCY DT ...... |

TABLE 1-continued

| INDIVIDUAL INFORMATION PD | | | |
|---|---|---|---|
| PERSONAL IDENTIFICATION INFORMATION PI | DRIVER INFORMATION DI | | |
| RECORD DATE *** | NUMBER OF TIMES OF EXCEEDING DECELERATION [TIMES/DAY] | ** | . . . . . . |
| | NUMBER OF TIMES OF EXCEEDING STEERING ANGULAR VELOCITY [TIMES/DAY] | ** | . . . . . . |
| | NUMBER OF TIMES OF EXCEEDING ACCELERATION [TIMES/DAY] | ** | . . . . . . |
| | NUMBER OF TIMES OF EXCEEDING VELOCITY [TIMES/DAY] | ** | . . . . . . |
| | NUMBER OF TIMES OF SHORT INTER-VEHICLE DISTANCE [TIMES/DAY] | ** | . . . . . . |
| | NUMBER OF TIMES OF PASSING YELLOW LIGHT [TIMES/DAY] | ** | . . . . . . |
| | NUMBER OF TIMES OF PASSING RED LIGHT [TIMES/DAY] | ** | . . . . . . |

The individual information PD including the driving tendency DT of the driver of the vehicle V as shown in Table 1 can be applied to, for example, calculation of insurance premium in telematics insurance. In this case, the server S installed in the data center DC outside the vehicle V illustrated in FIG. 1 can include, for example, insurance premium calculation software S3 and an insurance premium calculation database S4. The calculation of the insurance premium by the server S of the data center DC will be described later.

Furthermore, in addition to the driving tendency DT of the driver, the travel information TI of the vehicle V may include information such as a position, a travel route, a velocity, an acceleration, and an angular velocity of the vehicle V. Further, in addition to the travel information TI of the vehicle V, the driver information DI may include, for example, a position and an angle of a seat, a position and an angle of a mirror, the setting of the vehicle V for each driver such as lighting and air conditioning, the preference regarding on-vehicle infotainment, and the like.

As described above, the information acquisition unit 12 acquires the driver information DI including the travel information TI of the vehicle V by the DI collection unit 124, for example. Further, for example, the information acquisition unit 12 outputs the individual information PD stored in the PD storage unit 125 to the information management unit 13 via the interface unit 121 and the on-vehicle network 18 as necessary.

The information management unit 13 is, for example, a microcontroller or an ECU including a CPU, a memory, a timer, and an input and output unit. The information management unit 13 manages the individual information PD in which the personal identification information PI and the driver information DI are associated with each other as described above. The information management unit 13 includes, for example, an interface unit 131, an individual information storage unit 132, a secret key storage unit 133, an address calculation unit 134, an electronic signature unit 135, and a public key generation unit 136.

Each unit of the information management unit 13 may represent, for example, a function of the information management unit 13 realized by executing a program stored in the memory by the CPU. Furthermore, hereinafter, the individual information storage unit 132 may be abbreviated as a "PD storage unit 132".

The interface unit 131 transmits and receives data to and from the information acquisition unit 12 and the communication unit 15 via the on-vehicle network 18, for example. The PD storage unit 132 includes, for example, a memory, and acquires and stores the individual information PD stored in the PD storage unit 125 of the information acquisition unit 12 via the interface unit 131 and the on-vehicle network 18. Note that, in a case where the information acquisition unit 12 does not include the PD storage unit 125, the PD storage unit 132 of the information management unit 13 may store, as the individual information PD shown in Table 1 above, the personal identification information PI and the driver information DI individually acquired from the information acquisition unit 12 in association with each other.

The secret key storage unit 133 includes, for example, a nonvolatile memory such as a ROM, and stores a plurality of pieces of personal identification information PI and a plurality of secret keys SK in one-to-one correspondence. That is, in the secret key storage unit 133, one secret key SK is stored in association with one piece of personal identification information PI for one address. In the present embodiment, although the individual information PD is created from the personal identification information PI acquired by the key input unit 14 and the driver information DI acquired by the information acquisition unit 12, the individual information PD may be created by associating the personal identification information PI and the driver information DI stored in the secret key storage unit 133.

For example, the secret key SK can be written to the secret key storage unit 133 as follows. A seed serving as a source of the secret key SK is written to a nonvolatile memory at a production factory of the information management system 1, secret key encryption calculation software is installed in the information management unit 13, the seed is input to create the secret key SK, the secret key SK is written to the nonvolatile memory, and the corresponding seed is deleted. The secret key encryption calculation software may be downloaded before the seed is written in the production factory and may be deleted after the secret key SK is created.

For example, the address calculation unit 134 receives, as an input, the personal identification information PI included in the individual information PD stored in the PD storage unit 132, and outputs the address of the secret key storage unit 133 in which the secret key SK corresponding to the personal identification information PI is stored.

For example, the electronic signature unit 135 acquires the secret key SK while referring to the address of the secret key storage unit 133 output from the address calculation unit 134, and acquires the individual information PD from the PD storage unit 132. Here, the individual information PD is, for example, information in which the personal identification information PI is added to a head of the driver information DI. The electronic signature unit 135 calculates a hash value of the individual information PD acquired from the PD storage unit 132 by using, for example, a hash function. Further, the electronic signature unit 135 encrypts the calculated hash value by using the secret key SK acquired from the secret key storage unit 133. Accordingly, the electronic signature unit 135 can create an electronic signature by an RSA encryption scheme.

For example, the public key generation unit 136 acquires the secret key SK while referring to the address of the secret key storage unit 133 output from the address calculation unit 134, and generates the public key PK by using the acquired secret key SK. Note that each public key PK corresponding to the secret key SK unique to each driver stored in the secret key storage unit 133 may be transmitted to a transmission destination of the individual information PD of each driver in advance via the interface unit 131, the on-vehicle network 18, and the communication unit 15.

The information management unit 13 transmits the individual information PD to which the electronic signature is attached by the electronic signature unit 135 to the outside of the vehicle V via the interface unit 131, the on-vehicle network 18, and the communication unit 15. The electronically signed individual information PD transmitted from the vehicle V is transmitted to the wireless base station WBS via the wireless communication line RCL, for example, as illustrated in FIG. 1. The electronically signed individual information PD received by the wireless base station WBS is transmitted to, for example, the server S of the data center DC and the computer PC constituting the distributed network DN via the wired communication line WCL. For example, the server S and the computer PC authenticate the individual information PD to which the electronic signature is attached, which is received from the information management unit 13 of the information management system 1 with the public key PK generated by the same information management unit 13.

Furthermore, the computer PC or a user thereof may register, for example, the authenticated individual information PD in a blockchain. In this case, in the information management unit 13 of the information management system 1, when a block of new individual information PD is transmitted, the electronic signature unit 135 encrypts a hash value of a block of previous individual information PD with the secret key SK, and creates the electronic signature of the block of the new individual information PD. Accordingly, the computer PC or the user thereof can authenticate the individual information PD to which the electronic signature is attached with the public key PK and can register the individual information PD in the blockchain.

Furthermore, the information management unit 13 transmits information that does not require an electronic signature among the pieces of driver information DI acquired by the information acquisition unit 12 to the outside of the vehicle V via the interface unit 131, the on-vehicle network 18, and the communication unit 15 without creating an electronic signature. Furthermore, the electronic signature unit 135 may encrypt information including the individual information PD to be transmitted to the outside of the vehicle V with the secret key SK.

Hereinafter, an operation of the information management system 1 of the present embodiment will be described. As illustrated in FIG. 1, the information management system 1 of the present embodiment is connected to, for example, the distributed network DN or the data center DC, and the vehicle V and the data center DC transmit and receive data and programs in a phase direction.

Examples of the transmission of the data and programs from the data center DC to the vehicle V include firmware over-the-air (FOTA) for updating the program of the ECU, update of map data of a car navigation system, and distribution of music data. Furthermore, as an example of the transmission of the data from the vehicle V to the data center DC, there is an example of transmission of diagnostic information of parts of the vehicle V. In this case, the data center DC can perform part management of the vehicle V, for example, by transmitting the diagnostic information of the parts received from the vehicle V to a car dealer and replacing the parts by the car dealer.

Furthermore, in an insurance industry, there is an approach to use the travel information TI of the vehicle V. The telematics insurance in which the travel information TI of the vehicle V is reflected in the insurance premium is shifting from a stage of calculating the insurance premium based on a travel distance of the vehicle V to a stage of calculating the insurance premium based on the driving tendency DT of the driver, such as sudden braking or sudden acceleration of the driver. Furthermore, in the telematics insurance, for example, in a case where car sharing by a plurality of drivers is performed, such as a case where a plurality of residents in a large-scale apartment share and use the vehicle V, it is reasonable to set the insurance premium for each driver.

In a case where one vehicle V is used by a plurality of drivers, in order to apply to the telematic insurance for each driver, it is necessary to collect the travel information TI of the vehicle V for each driver and manage the collected travel information TI in a state of being able to be identified by the driver. Furthermore, the vehicle V is required to transmit the travel information TI including the driving tendency DT of the driver to the external data center DC in a state of being able to be identified by the driver. Further, in a case where the travel information TI for each driver is managed by a distributed ledger such as a blockchain, it is required to support registration to the blockchain.

Figure 5:
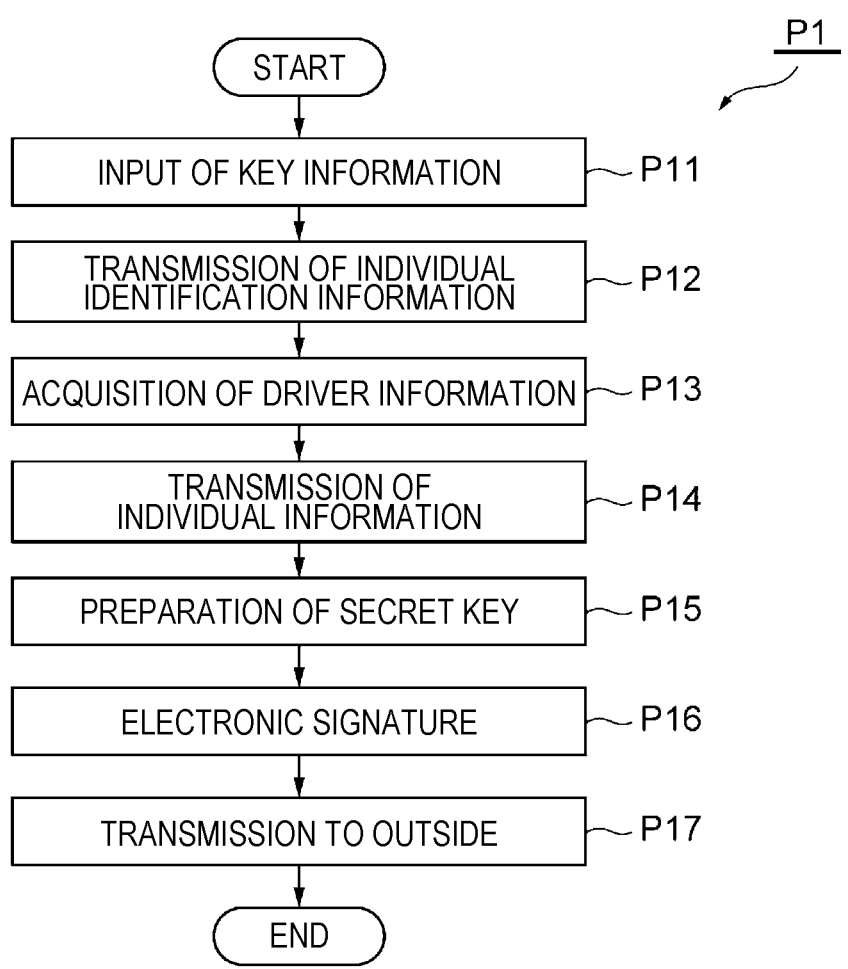
FIG. 5 is a flowchart illustrating an example of processing by the information management system of FIG. 2.

In response to the above-described problem, the information management system 1 of the present embodiment executes the following processing. FIG. 5 is a flowchart illustrating an example of a flow of processing P1 by the information management system 1. When the driver tries to turn on an activation switch of the vehicle V, the key input unit 14 mounted on the vehicle V communicates with the electronic key 2 or the PDA 3 possessed by the driver. Accordingly, the key input unit 14 receives the encrypted vehicle identification number VIN and the encrypted personal identification information PI from the electronic key 2 or the PDA 3.

By doing this, the information management system 1 starts processing P1 illustrated in FIG. 5, for example, and executes input processing P11 of key information. In processing P11, the driver identification unit 111 acquires the encrypted vehicle identification number VIN and the encrypted personal identification information PI of the driver from the key input unit 14. Further, as described above, the driver identification unit 111 decrypts and unencrypts the vehicle identification number VIN and the personal identification information PI, separates the vehicle identification number VIN and the personal identification information PI, and acquires the vehicle identification number VIN and the personal identification information PI.

Further, the VIN comparison unit 113 compares the vehicle identification number VIN acquired from the key input unit 14 with the vehicle identification number VIN stored in the VIN storage unit 112, and does not activate the vehicle V when the vehicle identification number and the vehicle identification number do not coincide. In this case, the information management system 1 ends the processing illustrated in FIG. 5. Here, it is assumed that the vehicle identification number VIN acquired from the key input unit 14 coincides the vehicle identification number VIN stored in the VIN storage unit 112. Subsequently, the information management system 1 executes, for example, transmission processing P12 of the personal identification information PI. In processing P12, the key authentication unit 11 transmits the personal identification information PI via the on-vehicle network 18, for example.

Subsequently, the information management system 1 executes, for example, acquisition processing P13 of the driver information DI. In processing P13, the information acquisition unit 12 receives the personal identification information PI via the on-vehicle network 18, for example, and stores the personal identification information in the PI storage unit 122. Further, the information acquisition unit 12 collects the driver information DI by the DI collection unit 124 according to the condition set by the condition setting unit 123. The information acquisition unit 12 stores the individual information PD in which the personal identification information PI and the driver information DI are associated with each other in the PD storage unit 125.

Subsequently, the information management system 1 executes, for example, transmission processing P14 of the individual information PD. In processing P14, the information acquisition unit 12 transmits the individual information PD via the on-vehicle network 18, for example.

Subsequently, the information management system 1 executes preparation processing P15 of the secret key SK, for example. In processing P15, the information management unit 13 receives the individual information PD via the on-vehicle network 18 by the interface unit 131, for example, and stores the individual information in the PD storage unit 132. Further, the information management unit 13 calculates the address of the secret key storage unit 133 in which the secret key SK corresponding to the personal identification information PI included in the individual information PD is stored by the address calculation unit 134, for example, and outputs the address to the electronic signature unit 135.

Subsequently, the information management system 1 executes electronic signature processing P16, for example. In processing P16, the information management unit 13 acquires the secret key SK corresponding to the personal identification information PI of the current driver of the vehicle V while referring to the address of the secret key storage unit 133 input from the address calculation unit 134 by the electronic signature unit 135, for example. Further, in processing P16, the electronic signature unit 135 acquires the individual information PD from the PD storage unit 132. The electronic signature unit 135 electronically signs the individual information PD by using the acquired secret key SK. Note that, in a case where the individual information PD is encrypted, the electronic signature may be performed after the encryption of the individual information PD.

Subsequently, the information management system 1 executes, for example, external transmission processing P17. In processing P17, the information management unit 13 transmits the individual information PD that has been electronically signed to the outside of the vehicle V via the interface unit 131, the on-vehicle network 18, and the communication unit 15, for example. Thus, processing P1 of the information management system 1 illustrated in FIG. 5 is ended.

The electronically signed individual information PD transmitted from the vehicle V is received by the server S of the data center DC or the computer PC of the distributed network DN via, for example, the wireless communication line RCL, the wireless base station WBS, and the wired communication line WCL illustrated in FIG. 1. For example, the server S of the data center DC authenticates the received electronically signed individual information PD by using the public key PK corresponding to the personal identification information PI included in the individual information PD by the insurance premium calculation software S3.

The insurance premium calculation software S3 of the server S registers the individual information PD in the insurance premium calculation database S4 after the authentication of the individual information PD. Here, as shown in Table 1 described above, the individual information PD is information in which the personal identification information PI of each driver of the vehicle V and the driver information DI are associated with each other. Furthermore, as described above, the driver information DI includes the travel information TI of the vehicle V driven by each driver, and the travel information TI includes the driving tendency DT of each driver.

Accordingly, the insurance premium calculation software S3 can appropriately calculate a risk for each driver based on the individual information PD for each driver registered in the insurance premium calculation database S4, and can calculate the appropriate insurance premium for each driver. Accordingly, it is possible to apply the telematics insurance to each driver even in a case where an unspecified number of drivers drive one vehicle V such as car sharing.

Furthermore, the computer PC constituting the distributed network DN authenticates the received electronically signed individual information PD by using, for example, the public key PK corresponding to the personal identification information PI included in the individual information PD and registers the electronically signed individual information in the blockchain. Accordingly, falsification of the individual information PD can be prevented, and a highly reliable database based on the distributed ledger can be constructed.

As described above, the information management system 1 of the present embodiment is a system that manages the driver information DI regarding the driver of the vehicle V. The information management system 1 includes the driver identification unit 111 that acquires the personal identification information PI of the driver of the vehicle V, the information acquisition unit 12 that acquires the driver information DI including the travel information TI of the vehicle V, and the individual information storage units 125 and 132 that store the individual information PD in which the personal identification information PI and the driver information DI are associated with each other.

With such a configuration, for example, even in a case where the plurality of drivers shares one vehicle V, the information management system 1 of the present embodiment can collect the driver information DI including the travel information TI in a state of being able to identify each driver based on the personal identification information PI.

Furthermore, the information management system 1 of the present embodiment further includes the communication unit 15 capable of communicating with the outside of the vehicle V, the secret key storage unit 133 that stores the unique secret key SK for each piece of personal identification information PI, and the electronic signature unit 135 that electronically signs the individual information PD by using the secret key SK unique to the personal identification information PI associated with the individual information PD. Furthermore, the communication unit 15 transmits the individual information PD to which the electronic signature is attached to the outside of the vehicle V.

With such a configuration, for example, even in a case where a plurality of drivers shares one vehicle V, the information management system 1 of the present embodiment can prevent impersonation by another person and can guarantee that the individual information PD is of each driver. Furthermore, when the individual information PD is transmitted and received to and from the vehicle V, the data center DC, the distributed network DN, and the like, the falsification of the individual information PD can be prevented, and the individual information PD can be transmitted and received in a secure environment.

Furthermore, in the information management system 1 of the present embodiment, the driver identification unit 111 acquires the personal identification information PI transmitted from the electronic key 2 of the vehicle V or the mobile information terminal 3 owned by the driver. With such a configuration, even in a case where a plurality of drivers use one vehicle V, it is possible to easily identify the driver.

Furthermore, the information management system 1 of the present embodiment further includes the public key generation unit 136 that generates the public key PK corresponding to the secret key SK unique to each piece of personal identification information PI. Furthermore, the communication unit 15 transmits the public key PK to the outside. With such a configuration, the information management system 1 can transmit the public key PK to a plurality of computers PC constituting the distributed network DN, and further transmit the individual information PD in which the electronic signature is created with the secret key SK. Thus, the individual information PD can be registered in the blockchain that is the distributed ledger based on a public key encryption scheme.

As described above, according to the information management system 1 of the present embodiment, in a case where a plurality of drivers drives one vehicle V, the driver information DI including the travel information TI of each driver can be independently collected and output. Furthermore, according to the information management system 1 of the present embodiment, it is possible to ensure security related to the identification of each driver. That is, according to the present embodiment, it is possible to provide the information management system 1 capable of solving the problem related to the handling of the information regarding each driver in a case where a plurality of drivers drives one vehicle V.

Second Embodiment

Figure 6:
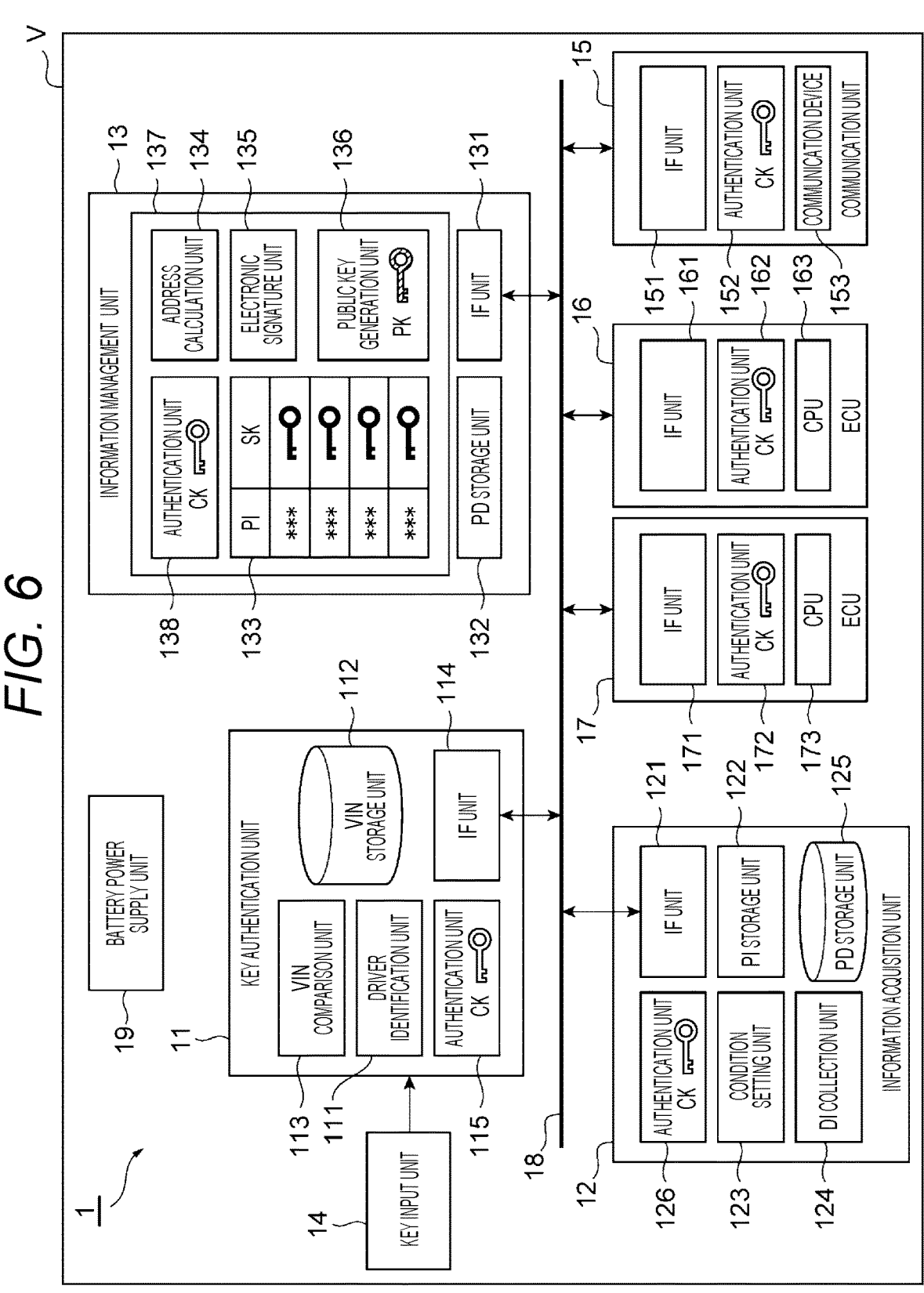
FIG. 6 is a block diagram of a vehicle on which an information management system according to a second embodiment is mounted.

Next, a second embodiment of the information management system according to the present disclosure will be described with reference to FIGS. 1, 3, and 4 and FIGS. 6 to 9. FIG. 6 is a block diagram of the vehicle V on which the information management system 1 according to the second embodiment is mounted. The information management system 1 is different from the information management system 1 of the first embodiment mainly in including a hardware security module 137 including the secret key storage unit

133 and the electronic signature unit 135. Hereinafter, the hardware security module may be abbreviated as an "HSM".

Furthermore, the information management system 1 or the vehicle V of the present embodiment is different from the information management system 1 or the vehicle V of the first embodiment in that each of the key authentication unit 11, the information acquisition unit 12, the communication unit 15, and the ECUs 16 and 17 includes authentication units 115, 126, 152, 162, and 172 constructed by the HSM. Furthermore, the information management system 1 or the vehicle V of the present embodiment includes, for example, a battery power supply unit 19. Since other configurations of the information management system 1 and the vehicle V of the present embodiment are similar to the configurations of the information management system 1 and the vehicle V of the first embodiment, similar components are denoted by the same reference signs, and the description thereof will be omitted.

The HSM 137 of the information management unit 13 includes a secret key storage unit 133, an address calculation unit 134, an electronic signature unit 135, and a public key generation unit 136 similar to the units in the first embodiment. The HSM 137 has, for example, a one-chip configuration in which all kinds of encryption processing are performed by one chip, has an integrated configuration that is difficult to disassemble, is hardware having a true random number generation function, and securely stores electronic keys such as a secret key SK, a public key PK, and a common key CK.

As described above, the information management system 1 of the present embodiment includes the hardware security module 137 including the secret key storage unit 133 and the electronic signature unit 135. With such a configuration, in a case where the plurality of drivers uses one vehicle V, the secret key SK unique to each driver is securely stored in the secret key storage unit 133 included in the HSM 137, and leakage of the secret key SK can be prevented more reliably. Accordingly, according to the information management system 1 of the present embodiment, not only effects similar to the effects of the first embodiment can be obtained, but also security in the identification of the driver can be ensured.

The HSM 137 further includes an authentication unit 138. The authentication unit 138 stores, for example, a common key CK used for message authentication. That is, the HSM 137 can perform not only the electronic signature by the secret key storage unit 133, the address calculation unit 134, the electronic signature unit 135, and the public key generation unit 136 but also message authentication by the authentication unit 138. For example, the HSM 137 can select whether or not to electronically sign data or perform message authentication of data in accordance with an instruction input together with the data.

Furthermore, the key authentication unit 11, the information acquisition unit 12, the communication unit 15, and the authentication units 115, 126, 152, 162, and 172 of the ECUs 16 and 17 are constructed by a hardware security module similar to the HSM 137 of the information management unit 13. Furthermore, these authentication units 115, 126, 152, 162, and 172 have the configuration similar to the configuration of the authentication unit 138 of the HSM 137. However, unlike the HSM 137, the authentication units 115, 126, 152, 162, and 172 do not include the secret key storage unit 133, the address calculation unit 134, the electronic signature unit 135, and the public key generation unit 136.

Each of the authentication units 115, 126, 138, 152, 162, and 172 calculates a MAC value by using the hash function based on the data transmitted to the on-vehicle network 18 and the common key CK. Furthermore, each of the authentication units 115, 126, 138, 152, 162, and 172 receives the data and the MAC value from the on-vehicle network 18, calculates the MAC value based on the received data and the common key CK, and compares the calculated MAC value with the received MAC value. When the calculated MAC value coincides the received MAC value, the authentication succeeds. Accordingly, the falsification of the data transmitted and received via the on-vehicle network 18 is prevented, and secure communication can be performed among the key authentication unit 11, the information acquisition unit 12, the information management unit 13, the communication unit 15, and the ECUs 16 and 17.

The battery power supply unit 19 includes, for example, a microcontroller or an ECU, and controls supply and stop of power from a battery mounted on the vehicle V to the information acquisition unit 12 and the information management unit 13 when the activation switch of the vehicle V is turned off.

The information management system 1 of the present embodiment is different from the information management system 1 of the first embodiment in that the individual information PD stored in the individual information storage units 125 and 132 is erased when the activation switch of the vehicle V is turned on or off. Hereinafter, processing by the information management system 1 of the present embodiment will be described.

Figure 7:
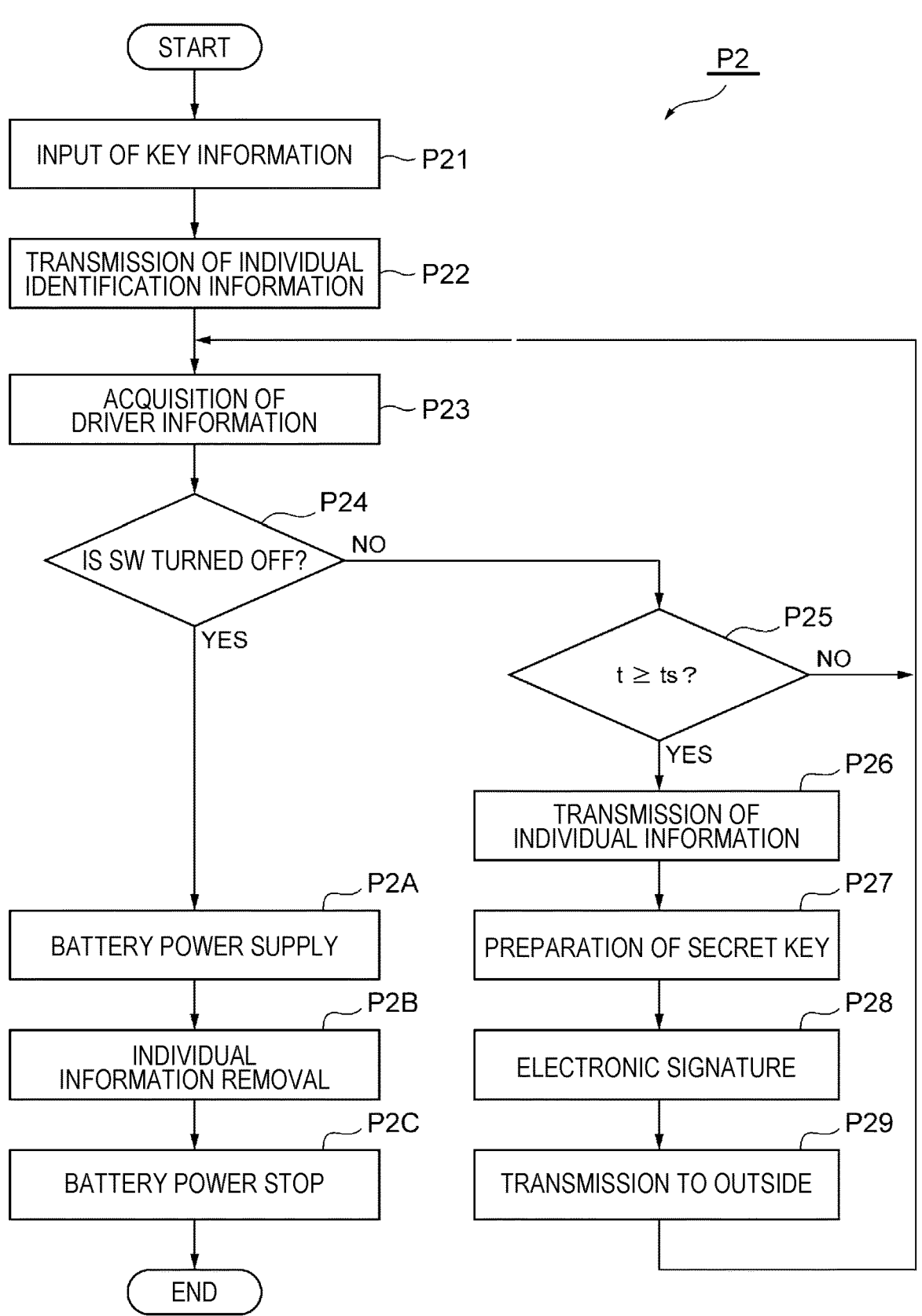
FIG. 7 is a flowchart illustrating an example of processing by the information management system of FIG. 6.

FIG. 7 is a flowchart illustrating an example of processing P2 by the information management system 1 of the present embodiment. When the processing P2 illustrated in FIG. 7 is started, the information management system 1 executes processing P21, P22, and P23 similar to input processing P11 of the key information, transmission processing P12 of the personal identification information PI, and acquisition processing P13 of the driver information DI of the first embodiment illustrated in FIG. 5. Subsequently, the information management system 1 executes processing P24 of determining whether or not the activation switch of the vehicle V is turned off by the battery power supply unit 19, for example.

In processing P24, for example, when it is determined that the activation switch is not turned off (NO), the information management system 1 executes determination processing P29 as to whether a predetermined time ts has elapsed since the activation switch of the vehicle V is turned on or previous external transmission processing P25 is ended. When it is determined in processing P25 that the predetermined time ts has not elapsed (NO), the information management system 1 executes processing P23 for acquiring the driver information DI again.

On the other hand, when it is determined in processing P25 that the predetermined time ts has elapsed (YES), the information management system 1 executes processing P26, P27, P28, and P29 similar to transmission processing P14 of the individual information PD, secret preparation processing P15 of the secret key SK, electronic signature processing P16, and external transmission processing P17 of the first embodiment illustrated in FIG. 5. Accordingly, the individual information PD is periodically transmitted to the outside of the vehicle V until the activation switch of the vehicle V is turned off.

On the other hand, when it is determined in processing P24 that the activation switch of the vehicle V is turned off (YES), the information management system 1 executes, for example, processing P2A of supplying power from the battery of the vehicle V to the information acquisition unit 12 and the information management unit 13 by the battery power supply unit 19.

Further, the information management system 1 executes processing P2B of erasing the individual information PD stored in the PD storage units 125 and 132 by the information acquisition unit 12 and the information management unit 13, for example. Thereafter, for example, the information management system 1 executes processing P2C of stopping the supply of power from the battery of the vehicle to the information acquisition unit 12 and the information management unit 13 by the battery power supply unit 19, and ends processing P2 illustrated in FIG. 7.

As described above, in the example illustrated in FIG. 7, the information management system 1 erases the individual information PD stored in the individual information storage units 125 and 132 when the activation switch of the vehicle V is turned off. Accordingly, in a case where the plurality of drivers use one vehicle V, it is possible to prevent the individual information PD of each driver from being known to other drivers and to protect the privacy of each driver.

FIG. 8 is a flowchart illustrating an example of another processing P3 by the information management system 1 of the present embodiment. When processing P3 illustrated in FIG. 8 is started, the information management system 1 executes processing P31, P32, and P33 similar to input processing P11 of the key information, transmission processing P12 of the personal identification information PI, and acquisition processing P13 of the driver information DI of the first embodiment illustrated in FIG. 5. Subsequently, the information management system 1 executes processing P34 of determining whether or not the activation switch of the vehicle V is turned off by the battery power supply unit 19, for example.

For example, when it is determined in processing P34 that the activation switch is not turned off (NO), the information management system 1 executes acquisition processing P33 of the driver information DI again. On the other hand, when it is determined in processing P34 that the activation switch is turned off (YES), for example, the information management system 1 executes processing P35 of supplying power from the battery of the vehicle V to the information acquisition unit 12 and the information management unit 13 by the battery power supply unit 19, for example.

Subsequently, the information management system 1 executes processing P36, P37, P38, and P39 similar to transmission processing P14 of the individual information PD, preparation processing P15 of the secret key SK, the electronic signature processing P16, and the external transmission processing P17 of the first embodiment illustrated in FIG. 5. Accordingly, the individual information PD is transmitted to the outside of the vehicle V when the activation switch of the vehicle V is turned off.

Thereafter, the information management system 1 executes processing P3A of erasing the individual information PD stored in the PD storage units 125 and 132 by the information acquisition unit 12 and the information management unit 13, for example. Thereafter, for example, the information management system 1 executes processing P3B of stopping the supply of power from the battery of the vehicle V to the information acquisition unit 12 and the information management unit 13 by the battery power supply unit 19, and ends processing P3 illustrated in FIG. 8.

As described above, in the example illustrated in FIG. 8, when the activation switch of the vehicle V is turned off, the information management system 1 erases the individual information PD stored in the individual information storage units 125 and 132, but transmits the individual information PD to the outside of the vehicle V via the communication unit 15 before the individual information PD is erased. Accordingly, in a case where the plurality of drivers use one vehicle V, not only the privacy of each driver can be protected, but also the individual information PD of the driver until the activation switch of the vehicle V is turned off can be transmitted to the outside of the vehicle V.

Figure 9:
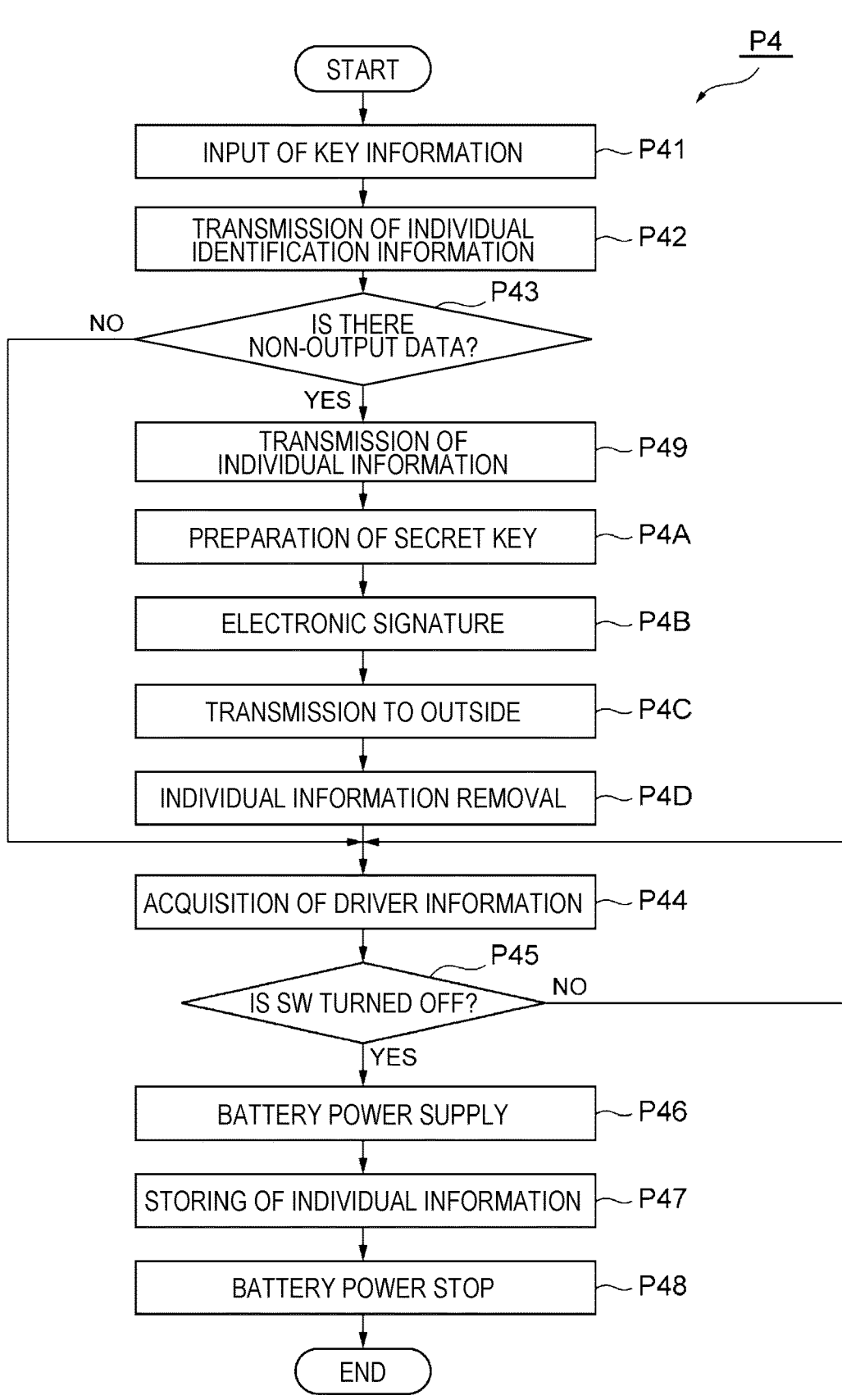
FIG. 9 is a flowchart illustrating an example of processing by the information management system of FIG. 6.

FIG. 9 is a flowchart illustrating an example of another processing P4 by the information management system 1 of the present embodiment. When processing P4 illustrated in FIG. 9 is started, the information management system 1 executes processing P41 and P42 similar to input processing P11 of the key information and transmission processing P12 of the personal identification information PI of the first embodiment illustrated in FIG. 5. Subsequently, the information management system 1 executes, for example, processing P43 of determining whether or not non-output individual information PD that has not been transmitted to the outside of the vehicle V is stored in the PD storage unit 125 or the PD storage unit 132 by the information management unit 13.

For example, when it is determined in processing P43 that the individual information PD is not stored in the PD storage unit 125 or the PD storage unit 132 and there is no non-output data (NO), the information management system 1 executes processing P44 similar to acquisition processing P13 of the driver information DI illustrated in FIG. 5. Subsequently, the information management system 1 executes, for example, processing P45 of determining whether or not the activation switch of the vehicle V is turned off by the battery power supply unit 19.

For example, when it is determined in processing P45 that the activation switch is not turned off (NO), the information management system 1 executes acquisition processing P44 of the driver information DI again. On the other hand, when it is determined in processing P45 that the activation switch is turned off (YES), for example, the information management system 1 executes processing P46 of supplying power from the battery of the vehicle V to the information acquisition unit 12 and the information management unit 13 by the battery power supply unit 19.

Subsequently, the information management system 1 executes, for example, processing P47 of storing and saving the individual information PD in a nonvolatile storage area of the PD storage unit 125 or the PD storage unit 132 by the information acquisition unit 12 or the information management unit 13. Thereafter, for example, the information management system 1 executes processing P48 of stopping the supply of power from the battery of the vehicle V to the information acquisition unit 12 and the information management unit 13 by the battery power supply unit 19, and ends processing P4 illustrated in FIG. 9.

Thereafter, for example, when the activation switch of the vehicle V is turned on again, the information management system 1 executes input processing P41 of key information and transmission processing P42 of personal identification information PI again. Here, previous individual information PD is stored in the nonvolatile storage area of the PD storage unit 125 or the PD storage unit 132 in a state of not being output to the outside of the vehicle V. Thus, the information management system 1 determines that there is non-output data (YES) in processing P43.

By doing this, the information management system 1 executes processing P49, P4A, P4B, and P4C similar to transmission processing P14 of the individual information PD, preparation processing P15 of the secret key SK, electronic signature processing P16, and external transmission processing P17 of the first embodiment illustrated in FIG. 5. Accordingly, when the activation switch of the vehicle V is turned on, the previous individual information PD that has not been output to the outside of the vehicle V is transmitted to the outside of the vehicle V.

Thereafter, the information management system 1 executes processing P4D of erasing the individual information PD stored in the PD storage units 125 and 132 by the information acquisition unit 12 and the information management unit 13, for example. Subsequently, the information management system 1 newly executes acquisition processing P44 of the driver information DI.

As described above, in the example illustrated in FIG. 9, the information management system 1 stores the individual information PD in the nonvolatile storage areas of the individual information storage units 125 and 132 when the activation switch of the vehicle V is turned off. Furthermore, when the activation switch of the vehicle V is turned on, the information management system 1 transmits the individual information PD stored in the nonvolatile storage areas of the individual information storage units 125 and 132 to the outside of the vehicle V via the communication unit 15 and then erases the individual information PD.

With such a configuration, when the plurality of drivers use one vehicle V, the individual information PD of the driver until the activation switch of the previous vehicle V is turned off can be transmitted to the outside of the vehicle V when the activation switch of the vehicle V is turned on next time. Further, it is possible to prevent the individual information PD of each driver from being known to other drivers and to protect privacy of each driver.

As described above, according to the information management system 1 of the present embodiment, when the plurality of drivers use one vehicle V, the secret key SK can be securely stored to ensure the security of the identification of the driver. Furthermore, according to the information management system 1 of the present embodiment, in a case where the plurality of drivers use one vehicle V, it is possible to protect the privacy of each driver. Accordingly, according to the present embodiment, in a case where the plurality of drivers drives one vehicle V, it is possible to provide the information management system 1 capable of solving the problem related to the handling of the information regarding each driver.

Third Embodiment

Figure 10:
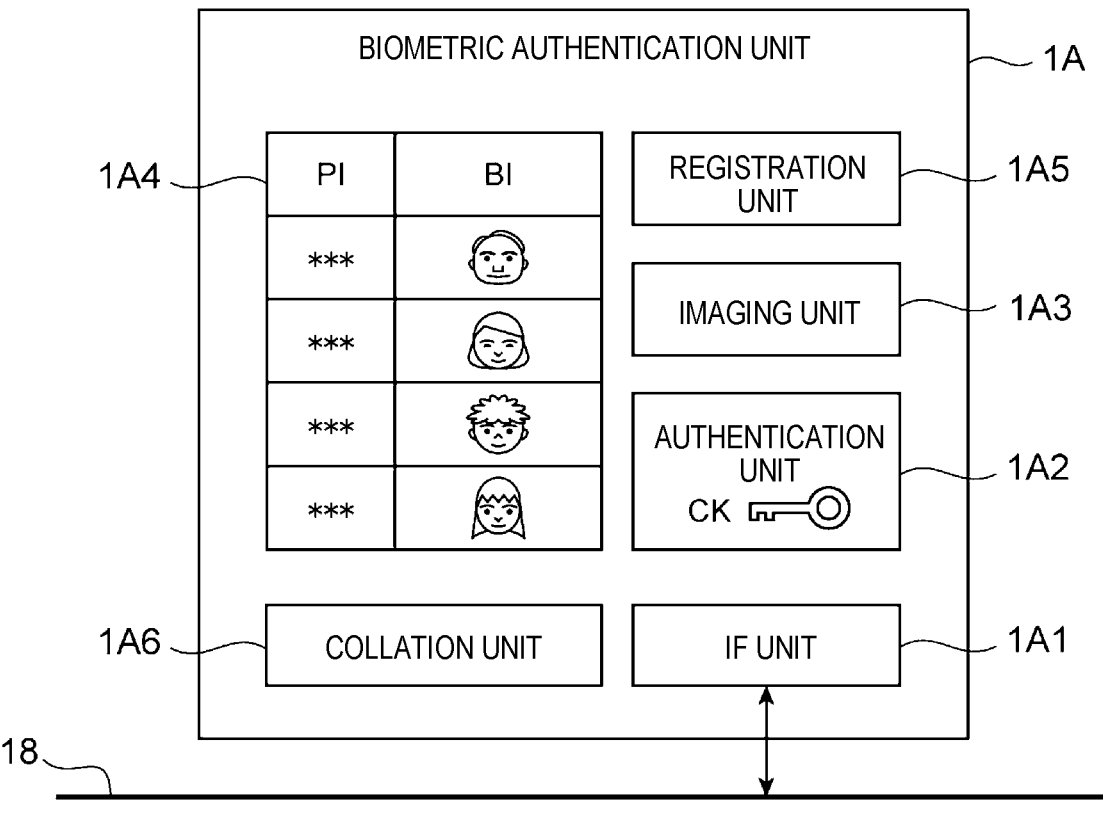
FIG. 10 is a block diagram of a driver identification unit of an information management system according to a third embodiment.

Next, a third embodiment of the information management system according to the present disclosure will be described with reference to FIGS. 1, 3, 4, and 6 and FIGS. 10 and 11. FIG. 10 is a block diagram of a driver identification unit (biometric authentication unit) 1A connected to the on-vehicle network 18 of the vehicle V illustrated in FIG. 6. The information management system 1 of the present embodiment is different from the information management system 1 of the second embodiment mainly in that the driver identification unit 1A illustrated in FIG. 10 is provided instead of the driver identification unit 111 of the key authentication unit 11 illustrated in FIG. 6. Since other configurations of the information management system 1 of the present embodiment are similar to the configurations of the information management system 1 of the second embodiment, similar components are denoted by the same reference signs, and the description thereof will be omitted.

As illustrated in FIG. 10, the driver identification unit 1A includes, for example, an interface unit 1A1, an authentication unit 1A2, an authentication information acquisition unit 1A3, an authentication information storage unit 1A4, a registration unit 1A5, and a collation unit 1A6.

The interface unit 1A1 is connected to, for example, the on-vehicle network 18, transmits information to the on-vehicle network 18, and receives information from the on-vehicle network 18. The authentication unit 1A2 has a configuration similar to the configuration of the authentication units 115, 126, and 138 included in the key authentication unit 11, the information acquisition unit 12, the information management unit 13, and the like, and performs message authentication of the information transmitted and received via the interface unit 1A1.

The authentication information acquisition unit 1A3 is a sensor that acquires biometric information BI of the driver of the vehicle V. The biometric information BI includes, for example, fingerprint information, finger vein information, palm vein information, face image information, iris image information, and the like. In the present embodiment, the authentication information acquisition unit 1A3 is, for example, an imaging unit such as a camera that captures a face image of the driver. Note that the authentication information acquisition unit 1A3 may be another sensor such as a fingerprint sensor.

The authentication information storage unit 1A4 includes, for example, a nonvolatile memory, and stores the personal identification information PI of the driver and the biometric information BI such as data based on the face image in association with each other. The registration unit 1A5 stores and registers the biometric information BI acquired by the authentication information acquisition unit 1A3 in the authentication information storage unit 1A4 in association with the personal identification information PI. Note that each piece of biometric information BI is associated with at least the unique personal identification information PI in the vehicle V.

The collation unit 1A6 collates the biometric information BI acquired by the authentication information acquisition unit 1A3 with the biometric information BI stored in the authentication information storage unit 1A4. In a case where the biometric information BI acquired by the authentication information acquisition unit 1A3 coincides the biometric information BI stored in the authentication information storage unit 1A4, the collation unit 1A6 acquires the personal identification information PI associated with the biometric information BI from the authentication information storage unit 1A4.

The collation unit 1A6 transmits the personal identification information PI acquired from the authentication information storage unit 1A4 to, for example, the information acquisition unit 12 or the secret key storage unit 133. In the present embodiment, the electronic key 2 illustrated in FIG. 3 or the PDA 3 illustrated in FIG. 4 transmits, for example, only the vehicle identification number VIN to the key authentication unit 11. Furthermore, in the present embodiment, the key authentication unit 11 illustrated in FIG. 6 may authenticate the vehicle identification number VIN, and thus does not include the driver identification unit 111.

Figure 11:
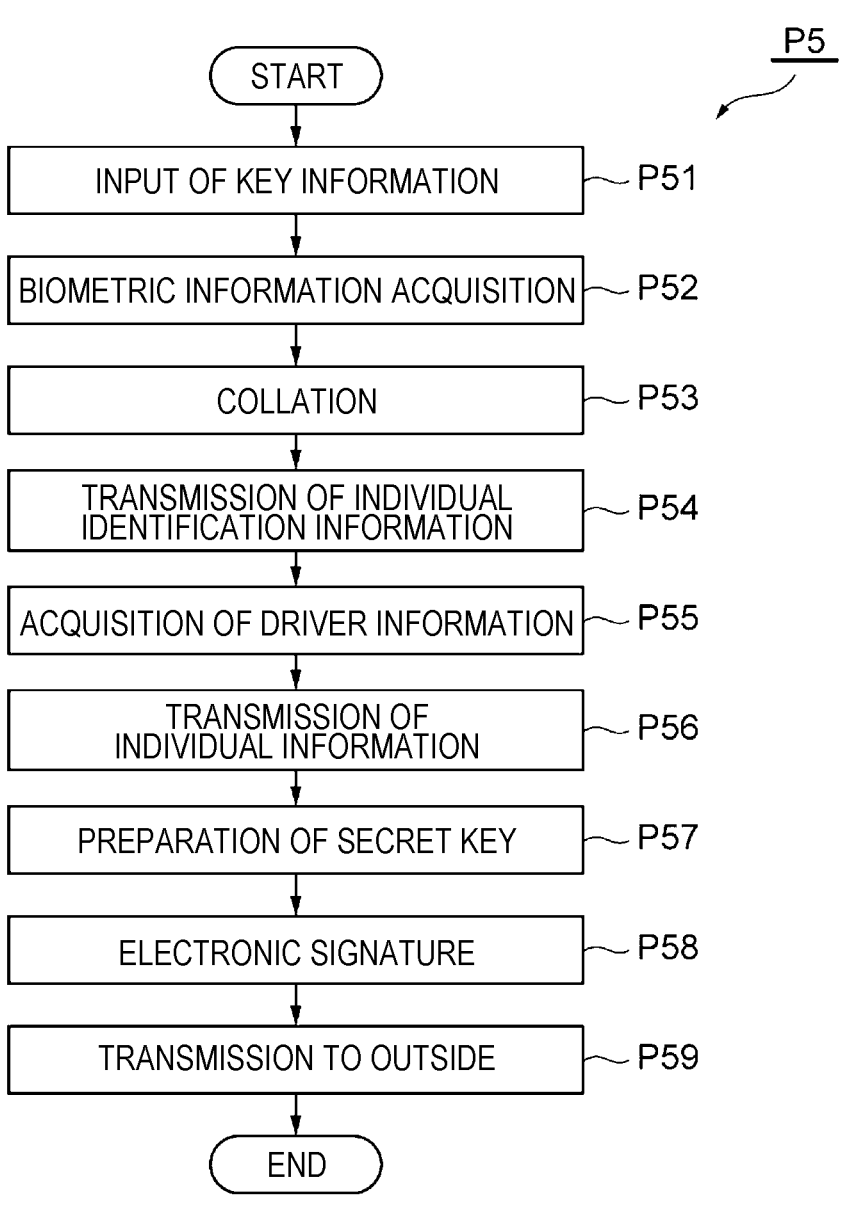
FIG. 11 is a flowchart illustrating an example of processing by the information management system according to the third embodiment.

Hereinafter, an operation of the information management system 1 of the present embodiment will be described. FIG. 11 is a flowchart illustrating an example of a flow of processing P5 of the information management system 1 of the present embodiment.

When the driver tries to turn on an activation switch of the vehicle V, the key input unit 14 mounted on the vehicle V communicates with the electronic key 2 or the PDA 3 possessed by the driver. Accordingly, the key input unit 14 receives the encrypted vehicle identification number VIN from the electronic key 2 or the PDA 3. By doing this, the information management system 1 starts processing P5 illustrated in FIG. 11, for example, and executes input processing P51 of key information.

In processing P51, the VIN comparison unit 113 acquires the encrypted vehicle identification number VIN from the key input unit 14, and decrypts and unencrypts the acquired vehicle identification number VIN. Further, the VIN comparison unit 113 compares the vehicle identification number VIN acquired from the key input unit 14 with the vehicle identification number VIN stored in the VIN storage unit 112, and does not activate the vehicle V when the vehicle identification number and the vehicle identification number do not coincide. In this case, the information management system 1 ends the processing illustrated in FIG. 11.

Here, it is assumed that the vehicle identification number VIN acquired from the key input unit 14 coincides the vehicle identification number VIN stored in the VIN storage unit 112. Subsequently, the information management system 1 executes, for example, biometric information acquisition processing P52. In processing P52, the driver identification unit 1A acquires the biometric information BI of the driver by the authentication information acquisition unit 1A3, for example. More specifically, for example, the imaging unit as the authentication information acquisition unit 1A3 captures the face of the driver to acquire the face image.

Subsequently, the information management system 1 executes collation processing P53. In processing P53, for example, the driver identification unit 1A collates the biometric information BI acquired by the authentication information acquisition unit 1A3 with the biometric information BI stored in the authentication information storage unit 1A4 by the collation unit 1A6. When these pieces of biometric information do not coincide, for example, the information management system 1 stores and registers the biometric information BI acquired by the authentication information acquisition unit 1A3 in the authentication information storage unit 1A4 in association with the unique personal identification information PI by the registration unit 1A5.

On the other hand, when the biometric information BI acquired by the authentication information acquisition unit 1A3 coincides the biometric information BI stored in the authentication information storage unit 1A4, the collation unit 1A6 acquires the personal identification information PI associated with the biometric information BI from the authentication information storage unit 1A4. Subsequently, the information management system 1 executes transmission processing P54 of the personal identification information PI.

In processing P54, the information management system 1 transmits the personal identification information PI acquired by the collation unit 1A6 to the information acquisition unit 12 and the information management unit 13 via the interface unit 1A1 and the on-vehicle network 18, for example. Thereafter, the information management system 1 executes processing P55, P56, P57, P58, and P59 similar to acquisition processing P13 of the driver information DI, transmission processing P14 of the individual information PD, preparation processing P15 of the secret key SK, the electronic signature process P16, and the external transmission process P17 of the first embodiment illustrated in FIG. 5. Accordingly, the individual information PD of the vehicle V is transmitted to the outside of the vehicle V.

As described above, in the information management system 1 of the present embodiment, the driver identification unit 1A includes the authentication information acquisition unit 1A3 that acquires the biometric information BI of the driver, the authentication information storage unit 1A4 that stores the biometric information BI and the personal identification information PI in association with each other, and the collation unit 1A6 that collates the biometric information BI acquired by the authentication information acquisition unit 1A3 with the biometric information BI stored in the authentication information storage unit 1A4. In a case where the biometric information BI acquired by the authentication information acquisition unit 1A3 coincides the biometric information BI stored in the authentication information storage unit 1A4, the collation unit 1A6 acquires the personal identification information PI associated with the coincided biometric information BI from the authentication information storage unit 1A4.

With such a configuration, according to the information management system 1 of the present embodiment, it is possible to achieve effects similar to the effects of the information management system 1 of the second embodiment without acquiring the personal identification information PI from the electronic key 2 or the PDA 3.

While the embodiments of the information management system according to the present disclosure have been described in detail with reference to the drawings, the detailed configurations are not limited to these embodiments, and even changes in design without departing from the gist of the present disclosure are included in the present disclosure.

For example, in the above-described embodiments, it has been described that the driver identification unit, the information acquisition unit, and the information management unit of the information management system are constructed by individual ECUs or microcontrollers. However, the information management system can be constructed by, for example, one microcontroller. Furthermore, the information management system may be constructed as a part of a vehicle control device mounted on the vehicle.

REFERENCE SIGNS LIST

1 information management system
111 driver identification unit
12 information acquisition unit
125 PD storage unit (individual information storage unit)
132 PD storage unit (individual information storage unit)
133 secret key storage unit
135 electronic signature unit
136 public key generation unit
137 HSM (hardware security module)
15 communication unit
1A driver identification unit
1A3 authentication information acquisition unit
1A4 authentication information storage unit
1A6 collation unit
2 electronic key
3 PDA (personal information terminal)
BI biometric information
DI driver information
PD individual information
PI personal identification information
PK public key
SK secret key
TI travel information
V vehicle

The invention claimed is:

1. An information management system that manages driver information regarding a driver of a vehicle, the system comprising:
   a driver identification unit that acquires personal identification information of the driver;
   an information acquisition unit that acquires the driver information including travel information of the vehicle; and
   individual information storage unit that stores individual information in which the individual identification information and the driver information are associated;
   a communication unit that is able to communicate with an outside of the vehicle;
   a secret key storage unit that stores unique secret key for each piece of personal identification information; and
   an electronic signature unit that electronically signs the individual information by using the secret key unique to the individual identification information associated with the individual information,
   wherein the communication unit transmits the identification information to which the electronic signature is attached to the outside of the vehicle.

2. The information management system according to claim 1, further comprising:
   a hardware security module that includes the secret key storage unit and the electronic signature unit.

3. The information management system according to claim 1, wherein, when an activation switch of the vehicle is turned off, the individual information stored in the individual information storage unit is erased.

4. The information management system according to claim 3, wherein the individual information is transmitted to the outside of the vehicle via the communication unit before the individual information is erased.

5. The information management system according to claim 1,
   wherein, when an activation switch of the vehicle is turned off, the individual information is stored in a nonvolatile storage area of the individual information storage unit, and
   when the activation switch of the vehicle is turned on, the individual information stored in the nonvolatile storage area of the individual information storage unit is transmitted to the outside of the vehicle via the communication unit, and is erased.

6. The information management system according to claim 1, wherein the driver identification unit acquires the personal identification information transmitted from an electronic key of the vehicle or a mobile information terminal owned by the driver.

7. The information management system according to claim 1, further comprising:
   a public key generation unit that generates a public key corresponding to the secret key unique to each piece of personal identification information,
   wherein the communication unit transmits the public key to an outside.

8. An information management system that manages driver information regarding a driver of a vehicle, the system comprising:
   a driver identification unit that acquires personal identification information of the driver;
   an information acquisition unit that acquires the driver information including travel information of the vehicle; and

23 individual information storage unit that stores individual information in which the individual identification information and the driver information are associated, wherein the driver identification unit includes an authentication information acquisition unit that acquires biometric information of the driver, an authentication information storage unit that stores the biometric information and the personal identification information in association with each other, and a collation unit that collates the biometric information acquired by the authentication information acquisition unit with the biometric information stored in the authentication information storage unit, and in a case where the biometric information acquired by the authentication information acquisition unit and the biometric information stored in the authentication information storage unit coincide, the collation unit acquires the individual identification information associated with the coincided biometric information from the authentication information storage unit.

* * * * *

24